United States Patent [19]

Brimacombe et al.

[11] E Patent Number: Re. 32,234

[45] Reissued Date of Patent: Aug. 26, 1986

[54] NON-FERROUS METAL TREATMENT

[75] Inventors: J. Keith Brimacombe, Vancouver; Enrique O. Hoefele, Regina, both of Canada

[73] Assignee: Canadian Liquid Air Ltd., Montreal, Canada

[21] Appl. No.: 447,805

[22] Filed: Dec. 8, 1982

Related U.S. Patent Documents

Reissue of:

[64] Patent No.: 4,238,228
Issued: Dec. 9, 1980
Appl. No.: 24,243
Filed: Mar. 27, 1979

[51] Int. Cl.[4] ..... C22B 15/06

[52] U.S. Cl. ..... 75/76; 75/82; 75/92

[58] Field of Search ..... 75/72-76, 75/21, 23, 82, 92

[56] References Cited

U.S. PATENT DOCUMENTS 3,627,510 12/1971 Vogt et al. ..... 75/75
3,819,362 6/1974 Bushaw et al. ..... 75/75
3,832,163 8/1974 Themelis et al. ..... 75/74
3,990,889 11/1976 Queneau et al. ..... 75/72

OTHER PUBLICATIONS

A. K. Biswas et al, "Extractive Metallurgy of Copper", Pergamon, 1976, pp. 12-14, 176-203 and 242-245.

J. K. Brimacombe et al, "High-Pressure Injection of Air into a Pierce-Smith Copper Converter", 1983.

*Primary Examiner*—Melvyn J. Andrews
*Attorney, Agent, or Firm*—Stevens, Davis, Miller & Mosher

[57] ABSTRACT

A method of converting a charge of non-ferrous metal matte in a Pierce-Smith or similar converter. The fluid charge is blown with a total flow of oxidizing gas *containing up to about 40% oxygen* effective to maintain autogenous converting temperatures through a plurality of spaced-apart tuyeres limited in number and individual cross-sectional area effective to maintain the gas underexpanded at a pressure within the range from about 50 to about 150 psig so that it penetrates the bath in the form of discrete steady *unshielded* jets to positions remote from the tuyere tips thereby reducing degradation of the refractories and build up of accretions. The gas is injected through from three to six tuyeres.

19 Claims, 3 Drawing Figures

NON-FERROUS METAL TREATMENT

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to the conversion of non-ferrous metal mattes to the metal or metal sulphide.

2. Description of the Prior Art

The Pierce-Smith converter has been used widely for this purpose, since the turn of the twentieth century, and so converting in this vessel will be used to exemplify the present invention. The operation of this apparatus is described in some detail in Extractive Metallurgy of Copper by Newton, Chapter V, Converting; in Extractive Metallurgy of Sulfide Ores by J. Boldt and P. Queneau, pages 249–252 (1967) and more of the complexities of the converting operation may be found in papers such as "Metallurgy of the Converting Process in the Thompson Smelter," a paper prepared for presentation at the 14th Annual Conference of Metallurgists, Edmonton, Alberta in August 1975, the contents of these publications being hereby incorporated by reference.

Fundamentally, the Pierce-Smith converter is made up of a horizontal cylinder providing within it an elongated sealed refractory lined chamber having a cylindrical sidewall and circular endwalls. The sidewall is provided with a hooded opening for charging and discharging located between the endwalls and a row of injection pipes, or tuyeres, entering the chamber through the refractory lining at one side. The vessel is rotated between a charging position in which the opening is accessible from the side that it can be charged and a blowing position in which the charging opening faces upward and is hooded and forms an off-gas outlet. With the vessel in blowing position air or air slightly enriched with oxygen is blown in through the tuyeres at low pressure, typically 15 psig to oxidize iron and sulfur in the matte and, thus, effect separation from the matte to form slag and release off-gases, namely, sulfur dioxide. The iron is converted to iron oxide, fluxed with silica and removed as a slag while the sulfur is oxidized to sulfur dioxide which leaves the converter in the off-gas. Further details of the converting operation in the Pierce-Smith converter are contained in the publications referred to and some of the complexities of chemical reactions, heat transfer and other relatively complex changes in conditions are described. Through the many years of operation of this type of converter, a manner of operation has developed which has undergone little change in the past few years.

There are certain disadvantages that have always plagued the use of this converter. For example, the tuyeres become plugged quickly and thus require clearing on a regular basis by punching with a metal rod which is forced through the tuyere. Another problem is that severe refractory wear occurs along the tuyere line, above the tuyeres in the backwall and the endwalls. This refractory wear is sufficiently excessive that a converter typically operates for only three months out of four, the other month being required for refractory repair. This results in high maintenance costs and necessitates excess converter capacity in a smelter operation.

A further problem is accretion build-up in the converter mouth, resulting from the accumulation of particles entrained in the off-gases and which is a function of the airflow. This build-up requires frequent cleaning. These problems seem to have been accepted as a fact of life in non-ferrous metal converting using the Pierce-Smith converter.

Attempts to improve refractory life have been in the area of using better, more wear-resistant refractories as for instance discussed in "The Copper Refractory Symposium" held in New York in 1968. At that Symposium various factors were described which adversely affect refractory life and which must be controlled, for example, wide rapid temperature variations, low-grade matte with resultant large slag volumes, fine or extremely coarse flux, punching and fluxing practice, low blowing rates, methods of cleaning the converter mouth, and modifying the normal converter heating periods.

SUMMARY OF THE INVENTION

In the face of the state of the art, the applicants have now found that tuyere plugging and refractory wear are related to the behavior of the gas jets discharging from the tuyere. At pressures at which air is normally blown into non-ferrous metal converters, that is between 12 and 15 psig, the air issues from the tuyere tip in the form of discrete bubbles at a frequency of 10 to 12 $s^{-1}$. The bubbles rise more or less vertically from the tuyere, break up into smaller bubbles, and wash against the backwall refractory, while the exothermic oxidation reactions promoted by the injection of the oxidizing gas and resulting from the oxidation of sulfur and iron take place in close proximity to the refractory wall. Moreover, the heat and pumping action of the rising bubbles combine to create rapid wear in the backwall area and also in the endwalls. The backwall refractory wear is relatively uniform axially above the tuyeres because there is considerable overlap of bubbles forming at adjacent tuyeres. The overlap is caused by the normal close tuyere spacing, for example, 6 to 7 inches, required to achieve sufficient air throughput.

Between the formation of successive bubbles at a given tuyere, the bath washes against the tuyere mouth and promotes the formation of accretions due to local freezing and magnetite formation. Successive deposits of accretions quickly plug the tuyere, and punching is required. Because the accretions attach themselves to the refractories, their abrupt and forced removal by the punching rod leads to pieces of the refractory breaking off with the accretions. In addition, repeated bubble formation causes rapid thermal cycling at the tuyere line, which stresses the refractory and accelerates local wear.

The applicants have developed a process which overcomes these disadvantages, as will be apparent from the following description. The converter, in charging position, is charged to a blowing level with non-ferrous molten metal matte. The converter is rotated until the tuyeres are submerged, with the [control] *flow* regulated, with sufficient air being introduced to keep the tuyeres open. Then the global air supply is adjusted so that an amount of air is supplied effective to carry out an autogenous converting reaction at temperatures within the capacity of the converter and at normal ambient pressure, without overheating, through several tuyeres whose number and individual cross-sectional area is such that the air is underexpanded and enters the bath horizontally in discrete steady jets extending some distance downstream from the tuyere tip before disintegrating into bubbles. The applicants have found that a preferred injection pressure is from about 50 to about 150 psig, desirably through 4 to 6 tuyeres spaced-apart so as to avoid merging of the jets. The tuyeres may be in the form of a single group of 3 to 6 tuyeres spaced from the endwall and spaced from the mouth of the converter. Alternatively, the tuyeres may be divided into two groups of tuyeres with each group spaced from an endwall and from the mouth of the converter. Desirably, the tuyeres will have a cross-sectional area from about 1 square inch to about 3 square inches and are spaced-apart from about 8 inches to about 24 inches. The closest tuyere to the endwall should be spaced from it at not less than about 36 inches. The spacing of the tuyeres away from the mouth of the converter reduces the turbulence in this area and reduces the accretion formation at the mouth of the converter.

It is thus seen that, according to the invention, air or air enriched with oxygen is injected with pressures such that underexpanded conditions are achieved in the tuyere, as compared with the employment of low pressure gas which issues from the tuyere fully expanded, that is, with the pressure at the tuyere mouth equal to the local bath pressure. The effect of increasing pressure to create underexpanded conditions is to raise the pressure at the tuyere mouth to a value in excess of the local bath pressure so that the air discharging from the tuyeres behaves as a steady rather than a pulsating jet and bubbles do not form regularly at the tuyere tip, but instead form some distance downstream from it. The jet penetrates [further] *farther* into the bath and the tip of the tuyere is continuously surrounded by gas. The higer pressures ensure that the jet is pushed [further] *farther* from the backwall because the momentum of the gas from the horizontally positioned tuyeres is greatly increased with increasing pressure. The high pressure injection reduces the problem of backwall refractory erosion by forcing the gas jet [further] *farther* into the bath. The continuous presence of gas at the tuyere mouth also inhibits the formation of accretions. Moreover, accretions that do form are broken off by the action of the jet. Accordingly, the frequency of tuyere punching is reduced or eliminated altogether as refractory wear at the tuyere line is reduced.

In the light of normal Pierce-Smith converter practice, one skilled in the art would expect that the increased pressure at which the air is introduced would increase splashing and accretion build-up at the mouth of the converter. This may be overcome by limiting the pressure to a maximum of about 150 [psi] *psig* and by placing the reduced number of tuyeres away from the converter mouth so that material ejected by the blowing falls back into the bath before reaching the mouth. One familiar with conventional blowing practice would also expect that concentrating the gas in fewer tuyeres would encourage local refractory wear through higher temperatures being generated in the region of the tuyere and that the flow of the liquid up the backwall above the horizontally directed tuyeres would be greater. The applicants have found, however, that with the steady jet penetrating [further] *farther* into the bath away from the backwall, that the extra heat generated is dissipated in the body of the bath and not at the backwall. One accustomed to the use of a large number of tuyeres at normal pressures would also expect that injecting the air through fewer tuyeres and in the form of jets rather than subdividing it into bubbles would provide a decrease in oxygen efficiency through lessened interface between the gas and liquid. However, provided their effective submergence within the molten metal is ensured the higher pressure jets have proven very active and provide good gas-liquid contact. The tips *of the tuyeres* should be at a level from about 18 to about 36 inches beneath the surface of the molten metal.

The applicants' operation in the underexpanded jet regime, by raising the pressure to the range from about 50 psig to about 150 psig, should not be confused with operating in the expanded jet regime at small pressure increases over normal, for example, *by* up to about say 10 to 15 psig as proposed by L. M. Shalygin and V. B. Meyerovich: Tsvet. Metal, 1960, vol. 33, No. 7, pp. 16–19. In order to achieve the results described by the applicants, pressure must be high enough to provide an underexpanded jet regime in which the jet differs in kind from those created at lower pressures while maintaining the total amount of oxidizing gas within the range required for the metallurgical operation by reducing the number of jets over that normally employed and maintaining their cross-sectional area within appropriate limits. This requires pressures of at least about 50 [psi.] *psig.*

Nor should the applicants' procedure be confused with proposals in the non-ferrous metal field to protect the injectors from the severe results of injecting pure oxygen by employing the Joule-Thomson effect created at high pressures of 400 [psi] *psig* or more. The applicants' range of pressure is directed merely to changing the jetting conditions from fully expanded to underexpanded, while maintaining the total oxidizing gas injected within normal limits of non-ferrous operations.

BRIEF DESCRIPTION OF THE DRAWINGS

Having thus generally described the invention, it will be explained more specifically by reference to the accompanying drawings which should be considered as exemplifying preferred embodiments, and in which.

DESCRIPTION OF THE PREFERRED EMBODIMENTS

Figure 1:
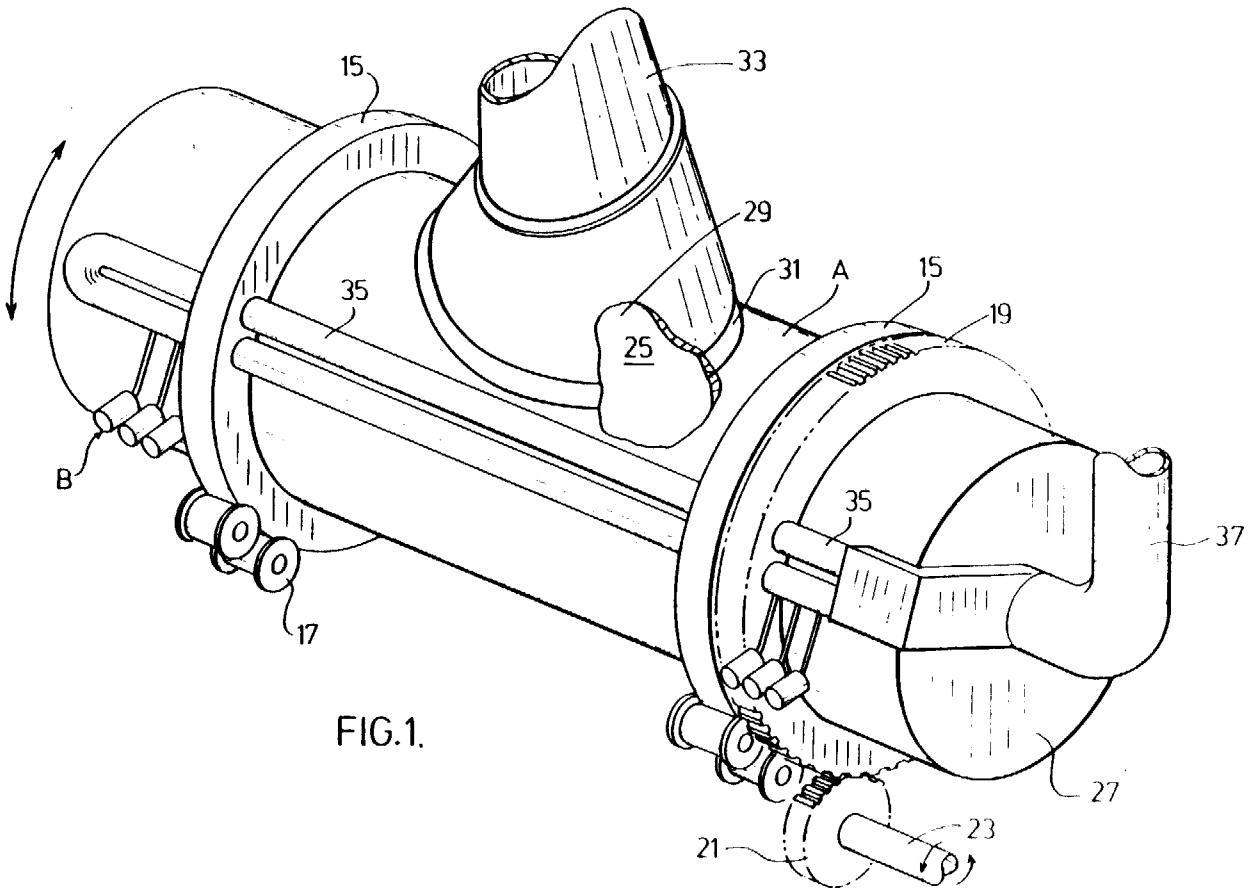
FIG. 1 is a schematic perspective view of a Pierce-Smith converter equipped according to the invention.

Referring more particularly to the drawings, the Pierce-Smith converter shown is made up of a cylindrical vessel A provided with spaced-apart circular supporting rings 15 riding on rollers 17 suitably journalled in an infra structure (not shown). A toothed ring 19 adjacent one of the rails 15 is engaged by a pinion 21 driven by the shaft 23 by a suitable drive source so that the vessel A may be rotated about its axis between a charging position and a blowing position.

The vessel A provides an internal cylindrical chamber having a refractory lined sidewall 25 and refractory lined endwalls 27. The sidewall 25 is provided with a charging opening 29 surrounds by a skirt 31 and provided with a hood 33.

A number of tuyeres B enter the chamber through its sidewall 25 and are supplied with oxidizing gas from a header 35 which receives its supply of compressed air or other oxidizing gas from an air inlet pipe 37 connected with a suitable source of such gas.

Each tuyere B extends through the [iron shell or] sidewall 25 [and the refractory lining 26] to terminate in a tip [24] at the surface of the refractory [26]. The tuyere B may be provided with a tuyere puncher.

Figure 2:
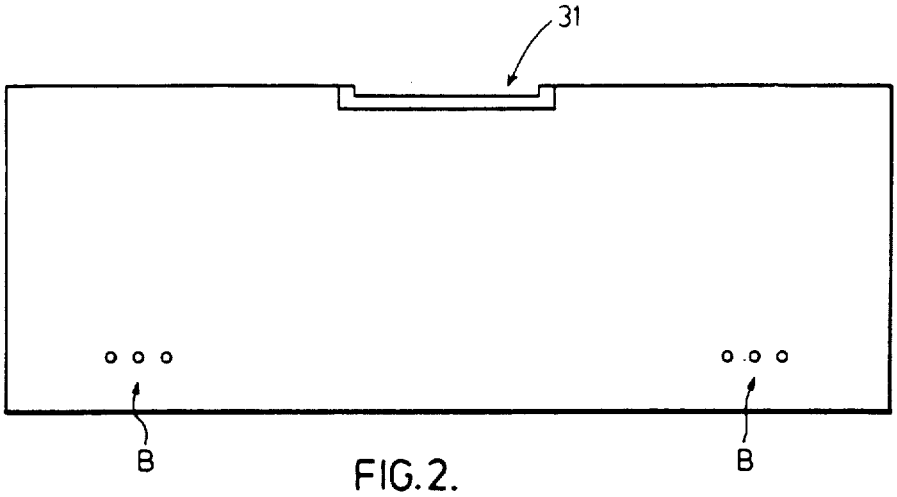
FIG. 2 is a schematic diagram of the inside of the converter showing one preferred arrangement of tuyeres according to the invention set in the refractory.
Figure 3:
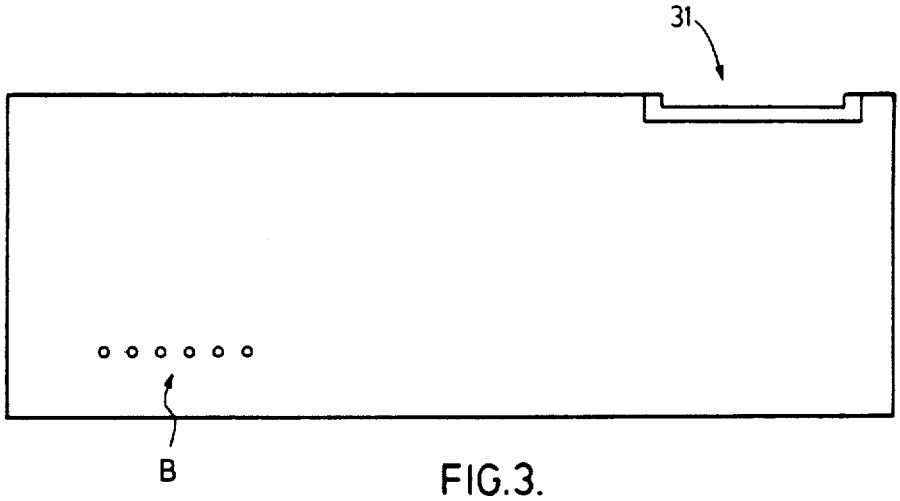
FIG. 3 is a schematic diagram showing another arrangement of tuyeres according to the invention.

In accordance with the invention, the number of tuyeres is reduced considerably as compared with the number used conventionally. One preferred arrangement is shown in FIG. 2. Here there are two groups of 2 to 3 tuyeres each spaced from the sidewalls 27 and from the mouth of the converter. Another preferred arrangement is shown in FIG. 3 where there is a single group of from 4 to 6 tuyeres spaced from one endwall and to one side of the mouth of the converter.

The tuyeres B may be perpendicular to the sidewall so as to operate in horizontal blowing position. Alternatively, special effects may be obtained by angling the tuyeres so that the steady jets are injected at an angle of up to about 15° from perpendicular to the refractory wall of the vessel. For example, downward injection may increase the efficiency of the oxidizing gas. Injection at an angle away from the endwall will remove the heating effect of the jet away from the endwall. Injection at an angle away from the mouth of the vessel will reduce turbulence in that zone and thus reduce accretions.

VARIABLE FACTORS

Converters

The Pierce-Smith converter has been described to characterize the invention, although it may be applied to any non-ferrous furnace using tuyere side injection of air or of oxygen enriched air.

A typical converter has external dimensions of 13 feet to 15 feet in diameter by 30 feet to 35 feet in length and is made with a 1 inch thick outer iron shell, a 1 to 1½ inch thick insulating layer of magnesite (MgO), 15 inches of chrome magnesite (MgO—35% $Cr_2O_3$) refractory bricks, except the same material is thicker, say about 18 inches, near the tuyeres.

Injectors

The injectors or tuyeres, basically the same as in current practice may be employed, are made from iron and have a straight bore. A typical injector has a 1½ inch to 2 inch inside diameter and is in excess of 18 inches to pass through the steel shell, insulating bricks and chrome magnesite bricks and to project some distance outside the vessel. The injectors are horizontal when the converter is in blowing position. In a conventional converter there are usually two sets of injectors on either side of the mouth with, for example, 40 tuyeres and two sets of 20 tuyeres each with spacing approximately 7 inches. All the injectors are the same. According to the present invention the number of active tuyeres is reduced with a preferred range from 4 to 6 with a spacing of at least about 15 inches apart.

Each tuyere may blow the same amount of air with several tuyeres linked to a common manifold. Preferably a separate control is provided for each tuyere so that the flow rate may be varied along the bath, provided that the flow rate is kept within the range stated. The diameters of the respective tuyeres may be varied as may their position in the converter. While the invention has been described and illustrated in connection with a furnace equipped with a smaller number of tuyeres than normally employed in the prior art, the furnace may be equipped with a larger number of separately regulatable tuyeres so that a few can be used at a time with the others cut off. This has the advantage that if eventually the refractory wear becomes a problem in the region of an active tuyere or set of tuyeres, it or they can be plugged externally and another set activated. In this way, lining life may be prolonged substantially.

In accordance with the invention the submergence of the tuyeres should be at least about 18 inches.

The tuyere arrangement pattern is to keep the tuyeres away from the endwall to minimize refractory erosion and away from the furnace mouth to minimize splashing problems and accretion build-up at the higher gas injection rates employed.

Control of the flow through the tuyeres is based on pressure in the tuyeres and/or temperature of the bath. Feedback control using pressure measurement may be used to activate tuyere punchers, if found necessary.

Feed Materials

The materials treated are non-ferrous mattes, that is a mixture of sulphides of copper and iron, and nickel and iron. The common denominator is the elimination of sulfur as sulfur-dioxide gas, and iron as a siliceous liquid slag of the type fayalite, $(FeO)_x.SiO_2$, where $1<x<2$; this slag also contains variable amounts of $Fe_3O_4$. The matte changes its composition during the cycle, as Fe and S are oxidized, and subsequently eliminated from the matte. The pressure range of the bath is atmospheric.

One ferrous metal which may be treated according to the invention is copper matte which usually contains from 20 to 60% copper (as $Cu_2S$), 2 to 6% oxygen (as iron oxides) with the remainder FeS and minor impurities. Another is nickel matte with usually from 10 to 50% nickel ($Ni_3S_2$) with usually small amount of copper (as $Cu_2S$), 2 to 6% oxygen (as iron oxides) with the remainder FeS and minor impurities.

A preferred flux is a siliceous flux containing not less than 80% $SiO_2$, to improve the heat balance. Flux containing as low as 65% $SiO_2$ is acceptable.

Oxidizing Gas

The oxidizing gas may be air or air enriched with up to about 40% oxygen. Enrichment with oxygen may be used so as to maintain the autogenous nature of the process and to melt the quantity of cold material that is charged, i.e. to adjust the heat balance. The gas is injected at a pressure, effective to provide underexpanded conditions [with] *within* the tuyere, from about 50 to about 150 [psi] *psig* and a linear speed above about 0.9 Mach. The overall flow rate is within the range from about 25,000 to 30,000 SCFM for furnaces of the size mentioned. The oxidizing gas jet is unshielded and is projected into the fluid charge in the form of a steady underexpanded jet as opposed to a pulsing jet. "Underexpanded jet" may be further explained as follows. When a gas is injected through a tuyere at low pressures, the pressure decreases along the tuyere in the direction of flow, until at the tip it is equal to the surrounding pressure (atmospheric plus pressure due to bath height). The gas jet is thus fully expanded. As the driving pressure is increased, the gas accelerates and the pressure drop along the tuyere becomes steeper. However, there is a limit to the velocity that the gas can attain in a straight-bore tuyere, i.e. the speed of sound (Mach 1). Thus at a sufficiently high back-pressure the gas reaches a terminal velocity (usually less than Mach 1 owing to frictional effects in the tuyere). Under these conditions the pressure inside the tuyere cannot be released by a further acceleration of the gas, and the pressure at the tip is greater than the ambient pressure. Thus the gas is not fully expanded (underexpanded) relative to the surrounding pressure. The excess pressure is released outside the tuyere by a multidirectional expansion of the gas.

Conditions

The conditions in the furnace during blowing in furnaces of the type and size exemplified are as follows. The range of temperature [of] *at* which converters operate according to the invention is from about 1100° C. to about 1300° C. The blowing time is from 6 to 20 hours depending on the grade of matte. The input may range from about 100 to 200 metric tons of matte depending on the matte grade, with 20 to 60 metric tons of flux (again depending on the matte grade). At this feed rate the oxygen necessary for the oxidation will be at a rate of 4,000 to 8,000 SCFM of oxygen in the oxidizing gas. The output ranges from about 70 to about 120 metric tons of copper per cycle and 30 to 80 metric tons of slag per cycle. The punching frequency with the conventional process is every 15 to 60 seconds. According to the applicants' procedure punching is usually not necessary until the end of the blow.

Punching will not normally be required during most of the converter cycle. However, the normal punchers are desirably included in the apparatus since they may be required towards the end of the cycle, especially for copper, when the gas flow, and hence temperature decreases.

Through the high pressure injection of the invention, the total gas flow rate may be increased up to about 30,000 SCFM in which case the reduction of cycle time will be roughly proportional to the increase in flow rate.

When the furnace is rotated from charging to blowing position, until the desired submergence is reached, it is desirable to maintain the pressure through the tuyeres at from about 10 to about 20 psig with about 15 psig preferred. Then the pressure may be increased to the desired level.

Th working of the invention will be explained in more detail by reference to the following examples of preferred procedures.

It should be borne in mind that an important factor in determining the length of a cycle is the grade of the starting material. The grades vary from about 20 to about 60% Cu (in the case of copper). This also affects converter operation. Therefore, the operation cycle will be described for both cases.

High grade mattes are obtained when the concentrates are rich in copper due to a high content of chalcocite ($Cu_2S$) and/or when flash melting methods are used to melt the solid concentrates. In such case, it is common to obtain a matte with say 55% Cu content. Since a higher content of Cu implies a lower content of Fe in the matte, smaller amounts of slag will be produced and the volume of the converter will be occupied to a larger extent by the value metal, i.e. $Cu_2S$ (obtained in the first stage of a copper-converting cycle). In such a case, the fresh matte (or starting matte) will be added fewer times (twice for 55% Cu matte) and the cycle length will be shorter, since there is less FeS to be oxidized in the first stage of converting.

EXAMPLE 1

A Pierce-Smith converter was employed 35 feet long by 13 feet in diameter using 6 tuyeres about [½] *1½*inch internal diameter. The feed material was copper matte (55% Cu). The flux contained 85% $SiO_2$. The oxidizing gas was air.

The following describes a treatment cycle.

First Stage:

1. The converter is hot, having just been emptied [from the cycle.] *during the previous cycle.*

2. 80 to 100 tons of matte are added through the mouth using ladles moved by cranes. 4 to 5 full ladles were needed to charge the converter. The matte was at a temperature of from 1100° to 1150° C.

3. With the converter in loading position (the tuyeres not immersed in the bath) air is blown through the tuyeres at low pressure, not higher than 15 [psi.] *psig.*

4. The converter is rotated until it reaches blowing position with the tuyeres submerged 18 inches in the molten matte.

5. The blowing pressure is increased to 120 psi *psig* immediately after converter reaches blowing position.

6. Air flow is maintained at a rate of about 25,000 SCFM for approximately 45 minutes. At this point, the converter temperature is approximately 1200° C. depending on the starting matte temperature.

7. The blowing pressure is decreased to 15 [psi,] *psig,* the converter is rotated to loading position and the air flow turned off.

8. 15 to 20 tons of siliceous flux are added through the converter mouth.

9. Blowing is restarted, following the same steps described in 3, 4 and 5 above.

10. After 20 to 30 minutes of blowing, air is shut off according to step 7.

11. At this point, the converter temperature is between 1220° to 1240° C. The matte grade would be between 72 to 75% Cu. About 35 tons of slag will have been produced.

12. Approximately 30 tons of slag (2 ladles) are skimmed off.

13. If the temperature of the converter in step 11 is higher than say 1230° C., about 10 tons of cold charge (solid recycle material) are loaded in the converter.

14. 40 to 60 tons of fresh matte (55% Cu) are added to the converter (2 to 3 ladles).

15. Some 10 to 20 tons of flux are commonly added at this point.

16. Blowing is started, following steps 3, 4 and 5.

17. Step 6 is repeated.

18. Steps 8 and 9 may or may not be necessary, depending on whether step 15 has been performed.

19. After 60 to 80 minutes of blowing (since step 16) the air is shut-off according to step 7.

20. At this point, the converter temperature will be about 1220° C. to about 1240° C. The matte grade is 78 to 80% (most of FeS, if not all has been oxidized and about 30 tons of slag have been produced) and this slag is skimmed off into ladles.

21. End of Stage 1; product left in the reactor 80 to 110 tons of $Cu_2S$.

Second Stage:

Basically $Cu_2S$ is the starting raw material. The same FeS and/or flux may be present.

22. If the temperature at the end of Stage 1 has been too high (over 1240° C. ) and/or if relatively pure copper reverts are available (80% Cu or more) add about 10 tons of cold reverts to the reactor.

23. Blowing is started following steps 3, 4 and 5 of the first stage.

24. The air flow is maintained at about 25,000 SCFM at 120 [psi.] *psig*. Usually there are no interruptions in the second stage. The temperature will rise slowly from about 1180° C. to about 1220° C. The blowing time will vary depending on the amount of $Cu_2S$ present in the beginning of Stage 2, but it is expected to be 3 to 4 hours (overall blowing time for the cycle about 5 to 8 hours. Note: This is blowing time. Overall time for the cycle, including charging, waiting for cranes, etc. will make the cycle 1 to 2 hours longer.

25. When the bath reaches 97 to 98% Cu (an experienced operator can tell the precise point) pressure is decreased to not more than 15 [psi.] *psig*.

26. After about 5 minutes the converter is rotated to loading position and the gas is turned off. Some flux may be added to account for any iron oxide that may be present.

27. The final product is 60 to 90 tons of blister copper (98.5 to 99.5% Cu).

Low Grade Matte

Low grade mattes are obtained when the concentrates are rich in chalcopyrite and are melted in a reverberatory furnace. In such case it is common to obtain a matte of say 30% Cu content. This means larger amounts of FeS in the matte, a larger volume of slag to be produced and smaller amounts of Cu (as $Cu_2S$) in the reactor.

To overcome this problem, fresh matte is added to the converter several times during the first blowing stage (perhaps 5 times for a 30% Cu matte) and the amounts of flux charged and slag produced change correspondingly. However, the converter is operated following the same principle: temperatures not higher than 1250° C. and good estimates of the matte grade during the blowing.

EXAMPLE 2

In this case a matte of grade having 30% Cu is treated in a converter similar to that of Example 1 using the same flux and air as the oxidizing gas.

The cycle was as follows:

Steps 1, 2, 3 and 4 were the same as in Example 1.

For steps 5 and 6, since the blowing time is longer, the temperature of the converter exceeds 1250° C. This is avoided by reducing the blowing pressure to about 80 [psi,] *psig*, through 6 tuyeres, and decreasing the overall flow to not more than 20,000 SCFM. Alternatively, the blowing pressure may be 120 [psi,] *psig*, but employing 4 tuyeres and, again, decreasing the overall flow to not more than 20,000 SCFM.

A further way of avoiding high temperatures is to use 120 [psi] *psig* blowing pressure, 25,000 SCFM total air injection, and 6 tuyeres, and the addition of larger amounts of cold recycled materials. This may be undesirable, due to the more frequent interruptions in the blowing that would be required. It may also not be feasible, if cold materials are not available in large enough amounts.

Apart from these exceptions, the procedure continues as in Example 1, but the blowing time would be greater (i.e. approx. 60 minutes).

7. The same as in Example 1.

8. 30 tons of flux are required.

9. The same as in Example 1.

10. Blowing time 30 to 45 minutes.

11. The same as in Example 1, except that the matte grade is 45% Cu.

12. 60 tons of slag are produced.

13. Add 10 to 20 tons of cold charge.

14. 60 tons of fresh matte (30% Cu)

15. 30 tons of flux

16. The same as in Example 1.

17. The same as in step 6 for low grade matte as described above.

18. The same as in Example 1.

19. 60 minutes, matte is 55 to 60% Cu.

20. Repeat as from step 12 to step 19 above but change:

12. To about 40 tons of slag.

13. To about 10 tons of cold charge.

14. To about 40 tons of matte.

15. To 20 tons of flux.

16 and 17. The same as in Example 1.

19. 60 minutes, the matte is about 70% Cu.

20 . Repeat steps 12 to 17, but change:

12. 30 tons of slag 13. 10 tons of slag cold revert (may not be necessary).

14. 20 tons of fresh matte 15. 10 tons of flux (otherwise 16 through 21 are the same as in Example 1 to end the first stage).

The second stage will be the same as in Example 1.

The following are variables which affect the operation.

The use of [enriched] oxygen-enriched air improves the heat balance and shortens the cycle length. It will be useful when, (a) the matte grade is higher than 50%, and therefore the lower content of FeS in fresh matte does not allow a large heat generation (cold mattes) in the first stage;

(b) although low grade mattes are available, large amounts of cold materials (recycled charge) or even concentrates need to be melted;

(c) during the second stage, specially if a higher flow per tuyere, due to increased pressures, causes some freezing of the melt in the tuyere zone.

The use of increased gas flow (30,000 SCFM or more) produces a similar effect to an increase in the $O_2$ concentration, i.e. improves heat generation. However, in addition, it may cause excessive amounts of material from the bath to be carried by the off-gases. It would also shorten the cycle length. It would be convenient when, (a) the tuyeres are located near end of the reactor, and the mouth is near the other end;

(b) there is a need for larger heat generation as specified above in connection with the use of oxygen-enriched air;

(c) no fine materials (such as concentrates) are charged into the reactor.

Reference has been made to the first stage of a copper converting cycle. So far Cu can be changed to Ni, bearing in mind that copper is present as $Cu_2S$ and nickel as $Ni_3S_2$. The operation is basically the same in each case.

However, once all the iron has been removed as slag, the method to obtain the respective metals differs. In the case of copper, $Cu_2S$ is oxidized by further blowing of air (or oxygen-enriched air) to obtain Cu. But this cannot be done in the case of nickel since that would cause oxidation of Ni to Ni oxides (this can be avoided at higher temperatures, but that is not central to the present invention, since it requires a different reactor. Therefore, in the case of nickel, the final product, according to the present invention, will be $Ni_3S_2$ (nickel sulfide) that later is converted into Ni by a completely different technique. In the case of copper, the production of the pure copper sulfide, $Cu_2S$ means the end of the first stage of converting, the second stage being the obtaining of Cu.

We claim:

1. A method of converting a bath of a nonferrous molten metal matte *and reducing the wear on the refractory and keeping the tuyeres free of blockage* in a converter vessel having an elongated sealed chamber formed by a cylindrical metallic sidewall and circular endwalls having refractory lining, the sidewall being provided with a charging port and an off-gas stack, a plurality of metallic tuyeres extending into the chamber through the sidewalls to refractory-surrounded exposed tips, means outside the vessel to supply oxidizing gas under pressure to the tuyeres, and means supporting the vessel on its horizontal axis for rotation between a charging position and a blowing position in which the tuyere tips are submerged in the bath, the process including a *batch* treatment cycle in which the vessel is initially charged with molten matte and a plurality of sequential blows carried out with the vessel being rotated back and forth between said charging and blowing positions and the gas introduced through the tuyeres or turned off accordingly for coordinated blowing, charging flux, removal of slag, *and* replenishing the charge, *over a time effective to convert the matte to the metal or the sulfide thereof,* and recovering converted metal from the vessel, comprising, carrying out the blows, *with the vessel stationary in blowing position,* by injecting into the bath *through the tuyeres in steady unshielded streams* a total flow of [oxidizing gas] *air or air enriched with up to about 40% oxygen* effective to maintain autogenous converting temperatures within the range from about 1100° C. to about 1300° C. through [a plurality of] *from 3 to 6 submerged* spaced-apart tuyeres limited in cross-sectional area and in number *at an injection pressure from about 50 to about 150 psig* effective to cause the gas *air* to enter the bath [at a pressure effective to provide discrete underexpanded steady jets] *in underexpanded condition from each tuyere as a discrete unshielded jet* which [continue] *continues* to a position remote from the tuyere [tips] *tip,* whereby wear of the refractory lining is reduced substantially to a minimum.

[2. A method, as defined in claim 1, in which the oxidizing gas is injected through the tuyeres at a pressure within the range from about 50 to about 150 psig.]

[3. A method, as defined in claim 1, in which gas is injected through from 3 to 6 tuyeres.]

4. A method, as defined in claim [3] *1,* in which *the* tuyeres have an individual cross-section within the range from about 1 square inch to about 3 square inches.

5. A method, as defined in claim [3] *1,* in which the tuyeres are spaced-apart at least about 8 inches and spaced from the endwalls at least about 3 feet.

[6. A method, as defined in claim 1, in which the oxidizing gas is injected through from 3 to 6 tuyeres at a pressure within the range from about 50 to about 150 psig, each tuyere having a cross-sectional area within the range from about 1 square inch to about 3 square inches, the tuyeres being spaced-apart at least about 8 inches and from the endwall at least about 3 feet.]

7. A method, as defined in claim [3] *1,* wherein the tuyeres are in a single group spaced at least about 3 feet from one endwall at one side of the middle of the converter.

8. A method, as defined in claim [3] *1,* in which the tuyeres are divided into two groups spaced at respective sides of the middle of the converter and each spaced at least about 3 feet from the end of the converter.

9. A method, as defined in claim 1, in which the vessel is charged in charging position and [oxidizing gas] *air* is fed through the tuyeres under expanded conditions while the vessel is moved from loading position to blowing position and vice-versa to submerge the tuyeres and the oxidizing gas pressure is then increased so that the oxidizing gas is underexpanded and blowing carried out.

10. A method, as defined in claim 9, in which the [oxidizing gas] *air* is fed through the tuyeres under expanded conditions at a pressure not greater than about 20 [psi] *psig* while the vessel is moved from loading position to blowing position and vice-versa to submerge the tuyeres, and a blow is then carried out by injecting gas through the tuyeres at a pressure from about 50 to about 150 [psi] *psig.*

11. A method, as defined in claim 1, in which the [gas] *air* is injected at least 15 inches below the surface of the molten charge.

12. A method, as defined in claim 1, in which at least some of the jets are directed inwardly at an angle from a sidewall.

13. A method, as defined in claim 1, in which at least some of the jets are directed downwardly at an angle from the horizontal.

14. A method, as defined in claim 1, wherein the material treated is copper matte.

15. A method, as defined in claim 1, in which the material treated is nickel matte.

16. A method, as defined in claim 1, in which the material treated is copper sulfide.

[17. A method, as defined in claim 1, in which the oxidizing gas is air.]

[18. A method, as defined in claim 1, in which the oxidizing gas is air enriched with oxygen up to about 40%.]

19. A method of treating a bath of a non-ferrous molten metal matte *and reducing the wear on the refractory and keeping the tuyeres free of blockage* in a converter vessel having an elongated sealed chamber formed by cylindrical metallic [sidewall] *sidewalls* and circular endwalls, the [sidewall] *sidewalls* being provided with a charging port and an off-gas stack, a plurality of metallic tuyeres extending into the chamber through the sidewalls to refractory-surrounded exposed tips, means outside the vessel to supply [oxidizing gas] *air or air enriched with up to about 40% oxygen* under pressure to the tuyeres, and means supporting the vessel on its horizontal axis for rotation between a charging position and a *stationary* blowing position in which the tuyere tips are submerged in the bath, the process including a treatment cycle in which the vessel is initially charged with molten matte and a plurality of sequential blows carried out with the vessel being rotated back and forth between said charging and blowing positions and the [gas] *air* introduced through the tuyeres or turned off accordingly for coordinated blowing, charging flux, removal of slag, *and* replenishing the charge *over a time effective to convert the matte to the metal or the sulfide thereof*, and recovering converted metal from the vessel, comprising, initially charging the vessel in loading position with molten matte, rotating the vessel into blowing position with the tuyeres submerged to at least about 18 inches while injecting [gas]*the air* through the tuyeres at a pressure at which the gas is expanded, then carrying out a cycle of blows, *with the vessel in stationary blowing position*, by injecting *into the bath through tuyeres in unshielded streams* a total flow of [oxidizing gas] *air or air containing up to about 40% oxygen* effective to maintain autogenous converting conditions at temperatures within the range from about 1100° C. to about 1300° C. through from 3 to 6 tuyeres having an individual cross-section within the range from about 1 square inch to about 3 square inches spaced-apart from about 8 to 24 inches and spaced from the endwalls at least about 3 feet at a pressure within the range from about 50 to about 150 psig effective to cause the gas *air streams* to enter the bath at a pressure effective to provide discrete *unshielded* underexpanded steady jets which continue to a position remote from the tuyere tips whereby wear of the refractory lining is reduced substantially to a minimum, the jets entering the bath at least 18 inches below the surface of the molten charge.

20. A method, as defined in claim 1 or 19, in which the total blowing time is at least [60 ] *6* hours.

21. A method, as defined in claim 19, in which the [oxidizing gas] *air* is fed through the tuyeres under expanded conditions at a pressure not greater than about 20 [psi] *psig* while the vessel is moved from loading position to blowing positon and vica-versa to submerge the tuyeres, and a blow is then carried out by injecting [gas] *the air* through the tuyeres at a pressure from about 50 to about 150 [psi] *psig*.

22. A method, as defined in claim 19, wherein the material treated is copper matte.

23. A method, as defined in claim 19, in which the material treated is nickel matte.

24. A method, as defined in claim 19, in which the material treated is copper sulfide.

[25. A method, as defined in claim 19, in which the oxidizing gas is air.]

[26. A method, as defined in claim 19, in which the oxidizing gas is air enriched with oxygen up to about 40%.]

* * * * *